Sept. 16, 1969 K. BREUER 3,467,338

INTELLIGENCE STORING TAPE DEVICE

Filed Nov. 6, 1967

INVENTOR:

Klaus Breuer by Irwin Salzer, atty.

United States Patent Office 3,467,338
Patented Sept. 16, 1969

3,467,338

INTELLIGENCE STORING TAPE DEVICE

Klaus Breuer, Frankfurt am Main, Germany, assignor to Hai Hacmun, Frankfurt am Main, Germany Filed Nov. 6, 1967, Ser. No. 680,793
Int. Cl. C11b *15/44*
U.S. Cl. 242—192 1 Claim

ABSTRACT OF THE DISCLOSURE

An intelligence storing tape device which includes an intelligence-carrying tape having a portion wound around a supply reel and another portion wound around a take-up reel and wherein the transfer of said intelligence-carrying tape from said supply reel to said take-up reel is effected by an additional drive tape forming an endless loop, the portion of the drive tape surrounding the supply reel being out of engagement with the tape thereon.

BACKGROUND OF THE INVENTION

In intelligence storing tape devices which include an intelligence-carrying tape having a portion wound around a supply reel, and another portion wound around a take-up reel, the transfer of the tape from the supply reel to the take-up reel must be effected at a constant linear velocity. Since the diameter of the winding of the intelligence-carrying tape on the supply reel decreases and the diameter of the windings of the tape on the take-up reel increases with progressive transfer of tape from the supply reel to the take-up reel, the requirement that the linear velocity at which the aforementioned transfer of tape is effected be constant implies that the angular velocities of the take-up reel and of the supply reel must change continually as the diameters of the tape windings on both reels are being changed. If the tape drive operates the aforementioned reels directly the drive must include control means for varying their angular velocity depending upon the diameters of the tape windings. The necessity of providing such control means greatly increases the cost of manufacturing intelligence storing devices wherein the storage of intelligence is effected on a tape which is wound upon reels.

It is possible to avoid the provision of control means of the aforementioned character if the motor drive for moving the tape operates the latter directly, e.g. by means of a tape-engaging capstan, rather than indirectly by the intermediary of a motor drive which operates the take-up reel. Intelligence-carrying tapes are, however, generally not suited to be operated or driven directly in this fashion.

The limitations and drawbacks of the two aforementioned systems can be avoided by providing an additional drive tape which forms a closed loop surrounding both the supply reel and the take-up reel. The additional drive tape may engage the portion of the intelligence-carrying tape which is wound upon the supply reel as well as the portion of the intelligence-carrying tape which is wound upon the take-up reel, and it may be driven at a constant linear velocity at any intermediate convenient point. Thus the additional drive tape drives both the supply reel and the take-up reel by the intermediary of the windings of intelligence-carrying tape thereon. In such an arrangement the additional drive tape may be elastic or non-elastic. At the points where the recording heads and the reproducing heads are located the drive tape is being separated from the intelligence tape, and at other points both tapes are again superimposed. Separation and re-superimposition of the intelligence-carrying tape, and of the drive tape, are effected by appropriate arrangements of rolls.

The aforementioned system is, however, subject to several limitations, or drawbacks. The intelligence-carrying tape may form a relatively loose loop or develop some slack in it as a result of which the additional drive tape may lose its firm engagement with the intelligence-carrying tape, and thus one of the two reels may not be driven any longer by the drive tape. This kind of malfunctioning occurs particularly when the operation of the tape drive is initiated. The formation of relatively loose loops or slack in the intelligence-carrying tape is hardly avoidable. If this occurs, the drive tape should establish tautness of the intelligence-carrying tape rather than fail to perform its function of driving the intelligence-carrying tape. The aforementioned arrangement of an additional drive tape has also a tendency of transmitting vibrations of the drive tape to the intelligence-carrying tape which impair proper recording and/or proper playback of intelligence.

This invention relates to a device of the above description including an intelligence-carrying tape and an additional drive tape, but is not subject to the aforementioned limitations and drawbacks.

SUMMARY OF THE INVENTION

Structures according to the present invention include a rotatable supply reel and a rotatable take-up reel and an intelligence-carrying tape having one portion wound around the supply reel and another portion wound around the take-up reel. Such structures further include an additional drive tape forming a closed loop for winding the intelligence-carrying tape from the supply reel to the take-up reel. Rotatable drive means engage the additional drive tape at a point thereof moving from the take-up reel to the supply reel and impart a constant linear velocity at said point to the additional drive tape. Structures according to this invention further include means for limiting the area of firm engagement between the additional drive tape and the intelligence-carrying tape substantially to that portion of the intelligence-carrying tape which is wound upon the take-up reel and causing that portion of the additional drive tape surrounding the supply reel to be out of firm engagement with the portion of the intelligence-carrying tape wound upon the supply reel. The aforementioned means include a brake device engaging the additional drive tape at a point thereof moving from the supply reel to the take-up reel.

DESCRIPTION OF PREFERRED EMBODIMENTS OF THE INVENTION

Figure 1:
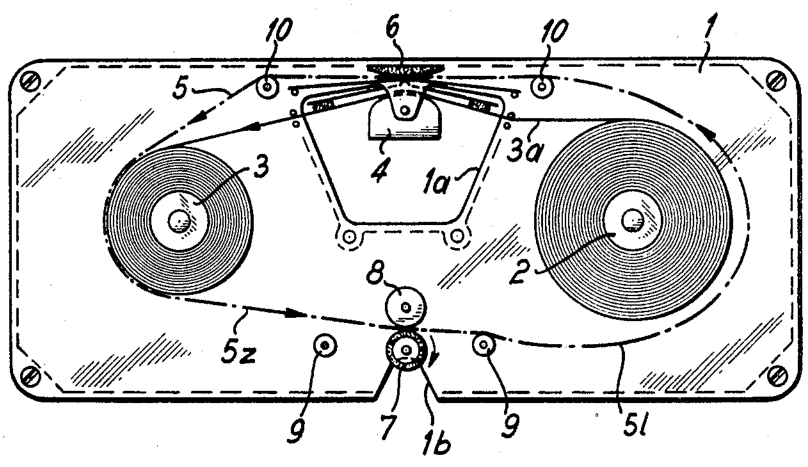
FIG. 1 is a diagrammatic representation of an embodiment of the invention wherein the additional drive tape firmly engages the left reel of an intelligence storing tape device and surrounds loosely the right reel of the device.
Figure 2:
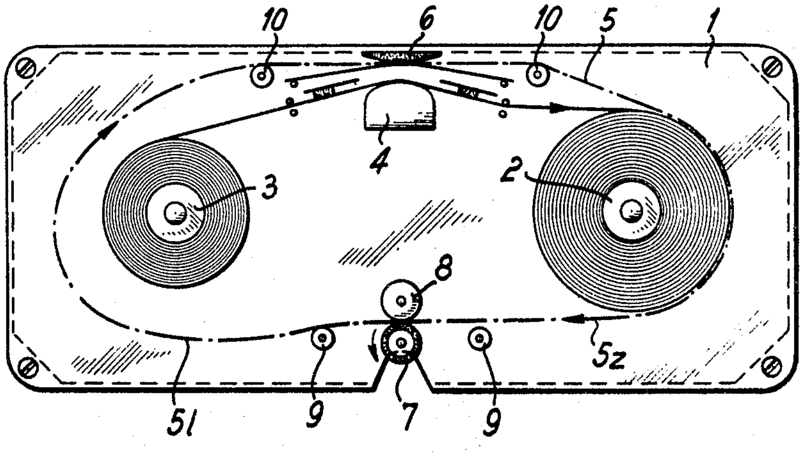
FIG. 2 is a diagrammatic representation of an embodiment of the invention wherein the additional drive tape firmly engages the right reel of an intelligence storing tape device and surrounds loosely the left reel thereof.

In both figures the same reference characters have been applied to designate like parts. Reference character 1 has been applied to indicate a housing for a motor drive (not shown). This motor drive operates a capstan 7 arranged in front of housing 1 and cooperating with a pressure roll 8 to drive tape 5 which is arranged therebetween. The linear velocity thus imparted to drive tape 5 is constant, and the direction in which tape 5 is being driven has been indicated by arrows in both FIG. 1 and FIG. 2. In FIG. 1 reference character 3 has been applied to indicate the reel which operates as take-up reel, whereas in FIG. 2 reference character 2 has been applied to indicate the reel which operates as take-up reel. It will be apparent from FIG. 1 that the intelligence-carrying tape 3*a* has a portion wound upon supply reel 2 and a portion wound upon take-up reel 3, and that tape 5 forms a closed loop which firmly engages the take-up reel and the tape 3*a* wound thereon, but which is out of firm engagement with supply reel 2 and the tape 3*a* which is wound thereon. As shown in FIG. 2 the loop formed by tape 5 firmly engages the take-up reel 2 and the tape 3*a* wound thereon, but is out of firm engagement with supply reel 3 and the tape 3*a* wound thereon. The angular velocity of reels 2 and 3 changes as the diameter of the windings of tape which are wound on the reels changes, but the linear velocity at which tapes 3*a* and 5 are being driven does not undergo any change, i.e. it is constant. Reference numeral 4 has been applied to indicate a reproducing head and/or recording head which cooperates with tape 3*a*. Reference numeral 6 has been applied to indicate a brake device arranged above head 4 and frictionally engaging one side of tape 5. As a result of the driving or pulling action of parts 7, 8 and of the braking action of brake device 6 tape 5 firmly engages the take-up reel and the windings of tape 3*a* on the take-up reel. On the other hand, the portion of the loop formed by tape 5 which surrounds the supply reel and the windings of intelligence-carrying tape 3*a* thereon is out of firm engagement with the portion of tape 3*a* wound upon the supply reel. As a result of these conditions the supply reel is not being driven by tape 5, but the take-up reel is being driven by tape 5.

Reference numerals 9 and 10 have been applied to indicate pairs of rolls or idlers. Their presence results in the formation of a loose loop portion by tape 5 around the supply roll 2 and 3, respectively.

Reference character $\mathbf{5}_z$ has been applied to indicate that portion of drive tape 5 which is kept taut by the coaction of parts 6, 7, 8, and reference character $\mathbf{5}_1$ has been applied to indicate that portion of drive tape 5 which is slack rather than tightly drawn.

The arrows adjacent capstan 7 in FIGS. 1 and 2 indicate that the supply reel may be turned into a take-up reel, and vice versa, simply by reversing the sense or rotation of capstan 7.

It will be apparent from the foregoing that what has been referred-to as the additional drive tape 5 is in effect a belt drive for one of the two reels only, i.e. for the take-up reel only, the supply reel not being driven except by the intelligence-carrying tape 3*a* which is being unwound from it.

The invention thus having been disclosed, that which is believed to be new and desired to be protected by Letters Patent is:

1. In an intelligence storing tape device including an intelligence-carrying tape being driven at a constant linear velocity the combination of:
   - (a) a rotatable supply reel;
   - (b) a rotatable take-up reel;
   - (c) an intelligence-carrying tape having one portion wound around said supply reel and another portion wound around said take-up reel;
   - (d) an additional drive tape forming a closed loop for winding said intelligence-carrying tape from said supply reel to said take-up reel;
   - (e) rotatable drive means engaging said additional drive tape at a point thereof moving from said take-up reel to said supply reel and imparting a constant linear velocity at said point to said additional drive tape; and
   - (f) means for limiting the area of firm engagement between said additional drive tape and said intelligence-carrying tape substantially to that portion of said intelligence-carrying tape which is wound upon said take-up reel and causing that portion of said additional drive tape surrounding said supply reel to be out of firm engagement with said portion of said intelligence-carrying tape wound around said supply reel, said means including a brake device engaging said additional drive tape at a point thereof moving from said supply reel to said take-up reel.

References Cited

UNITED STATES PATENTS

| | | | |
|---|---|---|---|
| 3,114,512 | 12/1963 | Peshel et al. | 242—55.12 |
| 3,305,186 | 2/1967 | Burdorf et al. | 242—55.12 |

GEORGE F. MAUTZ, Primary Examiner

U.S. Cl. X.R.

242—202